United States Patent
Mayana et al.

(10) Patent No.: US 9,369,573 B2
(45) Date of Patent: Jun. 14, 2016

(54) METHOD AND APPARATUS FOR IMPLEMENTING INQUIRY CALLBACK AND INFORMATION UPDATE SERVICES

(71) Applicants: Riyaz Ali Khan Mayana, Bangalore (IN); Malik Muheem, Karnataka (IN); Prelo M. Hood, West Grove, PA (US); Shakeel Ahmed Maniyar, Moline, IL (US)

(72) Inventors: Riyaz Ali Khan Mayana, Bangalore (IN); Malik Muheem, Karnataka (IN); Prelo M. Hood, West Grove, PA (US); Shakeel Ahmed Maniyar, Moline, IL (US)

(73) Assignee: Prelo M. Hood, West Grove, PA (US)

( * ) Notice: Subject to any disclaimer, the term of this patent is extended or adjusted under 35 U.S.C. 154(b) by 0 days.

(21) Appl. No.: 14/392,011

(22) PCT Filed: Jul. 23, 2013

(86) PCT No.: PCT/IB2013/001596
§ 371 (c)(1),
(2) Date: Jan. 21, 2015

(87) PCT Pub. No.: WO2014/016661
PCT Pub. Date: Jan. 30, 2014

(65) Prior Publication Data
US 2015/0131791 A1    May 14, 2015

(51) Int. Cl.
| | | |
|---|---|---|
| *H04M 3/42* | (2006.01) | |
| *H04M 3/02* | (2006.01) | |
| *H04M 3/428* | (2006.01) | |
| *H04M 3/436* | (2006.01) | |
| *H04M 3/493* | (2006.01) | |
| *H04M 3/523* | (2006.01) | |
| *H04W 4/16* | (2009.01) | |
| *G06Q 30/02* | (2012.01) | |
| *H04M 7/00* | (2006.01) | |

(52) U.S. Cl.
CPC ............ *H04M 3/42195* (2013.01); *H04M 3/02* (2013.01); *H04M 3/428* (2013.01); *H04M 3/436* (2013.01); *H04M 3/493* (2013.01); *H04M 3/5231* (2013.01); *G06Q 30/0241* (2013.01); *H04M 7/0048* (2013.01); *H04M 2203/1008* (2013.01); *H04M 2203/652* (2013.01); *H04W 4/16* (2013.01)

(58) Field of Classification Search
USPC .................................................... 379/210.01
See application file for complete search history.

(56) References Cited

U.S. PATENT DOCUMENTS

| | | | | |
|---|---|---|---|---|
| 6,625,270 | B1 * | 9/2003 | Banwell et al. ............... 379/196 |
| 7,839,987 | B1 * | 11/2010 | Kirchhoff et al. ......... 379/142.02 |
| 2002/0154754 | A1 * | 10/2002 | Karsten .................... 379/210.02 |
| 2012/0071157 | A1 * | 3/2012 | Markoulidakis ............. 455/423 |
| 2013/0124641 | A1 * | 5/2013 | Ryabchun et al. ............ 709/206 |

\* cited by examiner

*Primary Examiner* — Quynh Nguyen

(57) ABSTRACT

A system for implementing inquiry callback and information update services including a computer system having a miss call solution database. The computer system is configured to intercept an incoming call from a caller inquiring about a service, identify and log information corresponding to the caller, terminate the incoming call without interacting with the caller, and provide a miss call solution from the miss call solution database to the identified caller. The miss call solution including information corresponding to the service.

1 Claim, 14 Drawing Sheets

US 9,369,573 B2

METHOD AND APPARATUS FOR IMPLEMENTING INQUIRY CALLBACK AND INFORMATION UPDATE SERVICES

BACKGROUND OF THE INVENTION

1. Field of the Invention

Embodiments of the present invention generally relate to automated response systems, and more particularly to a method and apparatus for automatically responding to end user inquiries over a communication network with a customized response.

2. Description of the Related Art

There are numerous telemarketing solutions and campaign methods in use today. Many of these campaigns employ tactics which annoy end users with unsolicited and undesired cold call sales messages, either live or via short message service (SMS). Conversely, end users frequently place calls or SMS inquires in response to advertisements or public notices only to be placed on indefinite hold or sent through confusing computerized menu choices. The end result is often wasted time and excessive communication charges. Furthermore, the various companies and agencies placing advertisements or public notices may suffer cost inefficiencies from contacting end users that have no interest in their particular products or services. Also, there may be numerous end users which are interested in a particular service or product that are not contacted because their telephone numbers are listed in "Do Not Disturb" or "Do Not Call" databases.

Therefore, there is a need in the art for a method and apparatus for implementing inquiry callback and information update services wherein end users can proactively choose to be contacted and wherein the inefficiencies of placing end users on-hold or in automated message queues are minimized.

SUMMARY OF THE INVENTION

The present invention generally relates to a method and apparatus for implementing inquiry callback and information update services (e.g., for providing answers to advertising campaigns, details concerning published notices, status inquires, etc.). In one embodiment, the method and apparatus comprises an interface unit for managing call traffic, a modem, a digital interactive voice response (IVR) card, a computer system which further comprises at least one miss call software module and a return call solution database. In this embodiment incoming calls are intercepted, identified, logged, and terminated. A campaign solution is subsequently provided to the identified caller.

According to one aspect of the invention, a system is provided for implementing inquiry callback and information update services. The system includes a computer system including a miss call solution database, wherein the computer system is configured to: intercept an incoming call from a caller inquiring about a service; identify and log information corresponding to the caller; terminate the incoming call without interacting with the caller; and provide a miss call solution from the miss call solution database to the identified caller, the miss call solution including information corresponding to the service.

The system may include one or more optional features. Specifically, the system is optionally configured such that the incoming call is terminated after one ring. Also, the system optionally includes an interface unit for managing call traffic between the computer system and the caller including Primary Rate Interface (PRI) hardware, or an interface unit for managing call traffic between the computer system and the caller including a GSM to PRI gateway. The system optionally provides the miss call solution via a miss call IVR software solution module integrated with a bulk SMS service, and a campaign solution database, or with callback service, and a miss call solution database. The callback service of the system optionally comprises a pre-recorded message or a live agent.

According to another aspect of this invention, a non-transitory computer readable medium is provided including program code that when executed by a processor instructs the processor to perform the following steps: intercept an incoming call from a caller inquiring about a service, identify and log information corresponding to the caller, terminate the incoming call without interacting with the caller, provide a miss call solution from the non-transitory computer readable medium to the identified caller, the miss call solution including information corresponding to the service.

According to additional aspects of this invention, the system optionally includes one or more additional features. Specifically, the computer system and the customer optionally perform bi-directional communication to discuss the generation of the miss call solution, the bi-directional communication includes an agreement between the computer system and the customer that defines the miss call solution. Also, the computer system and the customer optionally agree on a type of hardware system to implement the miss call solution, a type of communication for communicating the miss call solution to the caller, a type of content conveyed in the miss call solution to the caller, and a type of monetary compensation paid by the customer for implementation of the miss call solution. Also, prior to intercepting the incoming call, the incoming call is optionally forwarded from a remote location device over the Internet to a base location device, and the base station device then forwards the incoming call to the computer system. Additionally, prior to intercepting the incoming call, the incoming call is optionally forwarded from a client phone number to a new phone number associated with the computer system for implementing inquiry callback, in response to the client implementing a call forwarding rule. A visual display is optionally provided for displaying the identity of the caller including at least one of web application software on a computer and a smart phone application, and the computer system is optionally configured to monitor the geo-location of the caller when the caller agrees to geo-location monitoring.

According to yet another aspect of this invention, a method is provided for implementing inquiry callback and information update services. The method includes intercepting an incoming call from a caller inquiring about a service, identifying and logging information corresponding to the caller, terminating the incoming call without interacting with the caller, and providing a miss call solution from a miss call solution database to the identified caller, the miss call solution including information corresponding to the service. The incoming call is optionally terminated after one ring.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention contemplates and includes other equally effective embodiments.

While the invention is described herein by way of example using several embodiments and illustrative drawings, those skilled in the art will recognize that the invention is not limited to the embodiments or drawings described. It should be understood that the drawings and detailed description thereof are not intended to limit the invention to the particular form disclosed, but on the contrary, the invention is to cover all modification; equivalents and alternatives failing within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. The word "ring" means any signal indicating an incoming call or SMS and not necessarily an audible, visual, or other sensory indication. And, the term "Miss Call" is used in the same sense as, for example, when a placed call to a telephone number is terminated before the called person has responded to the caller. Acronyms utilized throughout this application will be consistent with the following definitions:

GSM—Global System, for Mobile communication
CDMA—Code Division Multiple Access cell phone service
PRI (Primary Rate Interface)—A standardized telecommunication service level which provides a varying number of communication channels over a T1 or E1 carrier connection. The number of channels and carrier signal format (E1 or T1) depends on the standards employed in a particular geographical location.
IVR—Interactive Voice Response
E1—Digital carrier signal format typically used in countries outside of the United States, Canada, and Japan.
T1—Digital carrier signal format typically used in the United States, Canada, and Japan.

DETAILED DESCRIPTION

Figure 1:
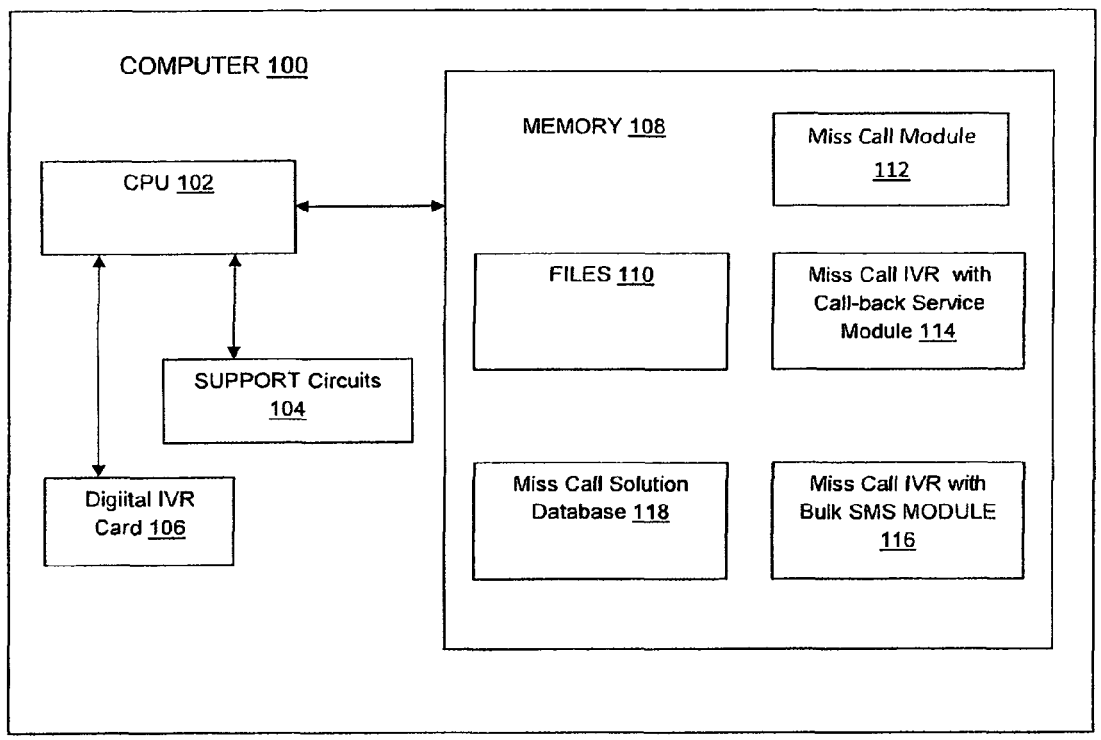
FIG. 1 is a block diagram of a computer system for implementing inquiry callback and information update services in accordance with various embodiments of the present invention.

FIG. 1 is a block diagram of a computer system 100 for implementing callback and inquiry updates services according to various embodiments of the present invention. The computer system 100 is capable of executing applications and may be connected to a communication network (not shown). The communication network may generally form a portion of the Internet which may comprise various sub-networks such as Ethernet networks, local area networks, wide area networks, wireless networks, and the like. Computer system 100 comprises, without limitation, input/output devices (not shown), a CPU 102, support circuits 104, a digital IVR card 106, and a memory 108. The CPU 102 may be one or more of any commercially available microprocessors or microcontrollers. The support circuits 104 comprise circuits and devices that are used in support of the operation of CPU 102. For example, input and output devices (not shown), CPU 102, digital IVR card 106, and memory 108 are inter-connected through the support circuits 104. Such support circuits include, for example, cache, input/output circuits, communications circuits, clock circuits, power supplies, system bus, PCI bus and the like. Those skilled in the art will appreciate that the hardware depicted in FIG. 1 may vary from one computer system to another. For example, other peripheral devices, such as optical disk drives, graphics card, data storage devices, various other input devices and the like, may also be used in addition to or in place of the hardware depicted.

Various types of software processes or modules and information are resident within memory 108. Memory 108 may comprise random access memory, read only memory, removable storage, optical storage and the like. Files 110 include any file of interest to the user. Such files may include patch files that are configured to be downloaded and installed, cached files of browsers, or any data file in general. In at least one embodiment, Miss Call module 112, Miss Call IVR with Callback Service module 114, Miss Call IVR with Bulk SMS module 116, and Miss Call Solution Database 118, are stored in memory 108. Module 112, module 114, and module 116 are sets of instructions executed by CPU 102 utilizing information stored in Miss Call Solution Database 118 to perform one or more methods in accordance with at least one embodiment of the present invention.

In at least one embodiment, Miss Call module 112 uses an advance IVR software engine and Digital IVR Card 106 to detect incoming calls and the callers' corresponding ID. Miss Call Module 112 disconnects the incoming call after one ring upon detecting the Caller ID. There is no need for the end user (i.e., the caller) to disconnect the call. The Caller ID is logged in two formats, one in clear text format in the IVR Engine Log and another in Miss Call Solution Database 118 with the following details:

Caller ID Number
Date
Time
Digital Card Channel No. (if the call is received via a GSM to PRI gateway). After the caller's ID and related information is logged, Miss Call Module 112 may send a confirmation message back to the caller informing the end user that he has subscribed to a service successfully and that he can unsubscribe or deactivate the service simply by calling again. Details of the service related to the specific number that the end user has called is also stored in Miss Call Solution database 118. Such details are pre-defined by a customer that may be conducting advertising campaigns, providing services, or publishing various types of notices or status updates (e.g., company, agency, or anyone employing the present invention). Some geographical areas (for example India and the United States) have restrictions on placing certain unsolicited calls. For those areas, it is important to note that sent messages will be of the type which can reach any number whether or not the number is in a "Do Not Disturb" or "Do Not Call" Non-DND database. Miss Call Module 112 uses various Management Information System (MIS) software (not shown) to view and manage logged information in accordance with customer requirements. Information delivery may be instant or scheduled per the requirements of the customer's campaign (i.e., service offering). If the sent message is via a callback service, Miss Call IVR with Callback Service module 114 integrates the campaign solution prescribed by the customer with a pre-recorded IVR message or a live agent. Alternately, if the sent message is a SMS service, Miss Call IVR with Bulk SMS module 116 integrates the Miss Call solution with a Bulk. SMS service to deliver the campaign solution.

Figure 2:
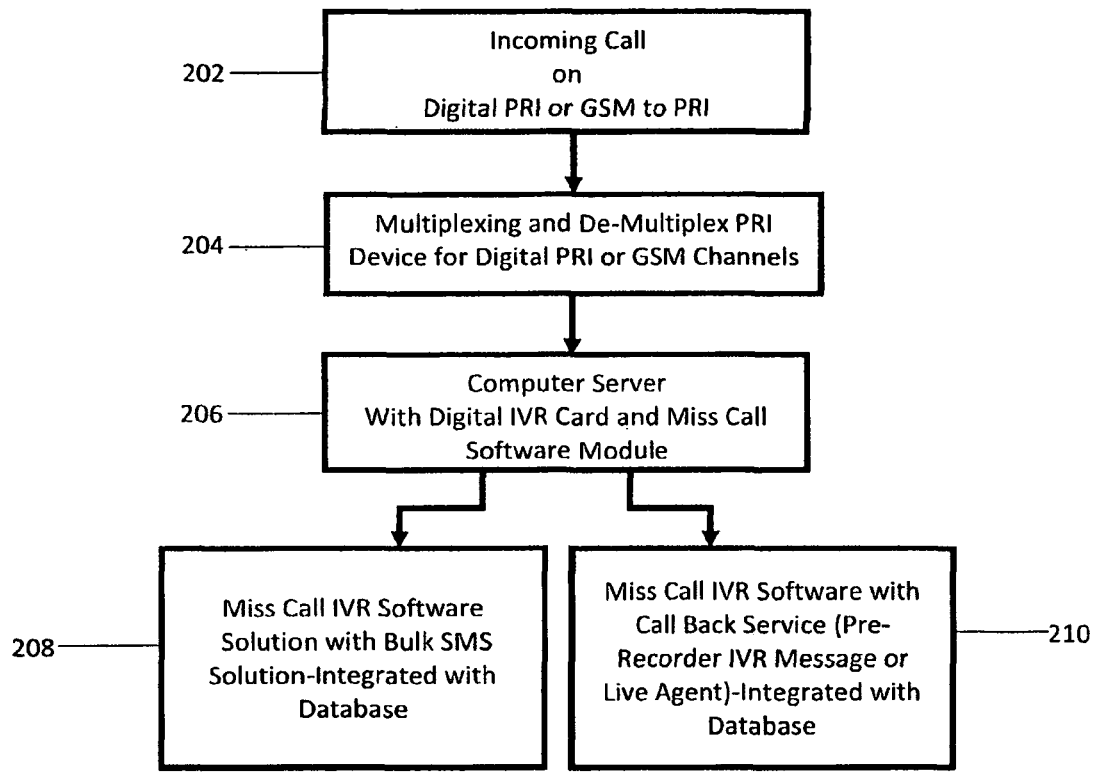
FIG. 2 is a flow diagram of a method for implementing inquiry callback and information update services using Bulk SMS or Callback Services in accordance with an embodiment of the present invention.

FIG. 2 is flow diagram of a method for implementing inquiry callback and information update services using Bulk SMS or Call-back Services in accordance with an embodiment of the present invention. In step 202, incoming calls are received through digital PRI hardware or a GSM to PRI gateway. In step 204 the call signal is passed through a modem (i.e., a multiplexer/de-multiplexer which can extract the call information from the E1 or T1 carrier signal) to deliver the call information to a computer server in step 206 (for example, computer 100) for processing. The computer server processes the call information in a manner as described above for FIG. 1. A Miss Call solution is integrated with a Bulk SMS service (step 208) or with a Callback Service (step 210) for delivery to the end user (i.e., the caller) as prescribed by a customer's campaign solution whose information is stored in the computer server database (for example, Miss Call Solution Database 118).

Figure 3:
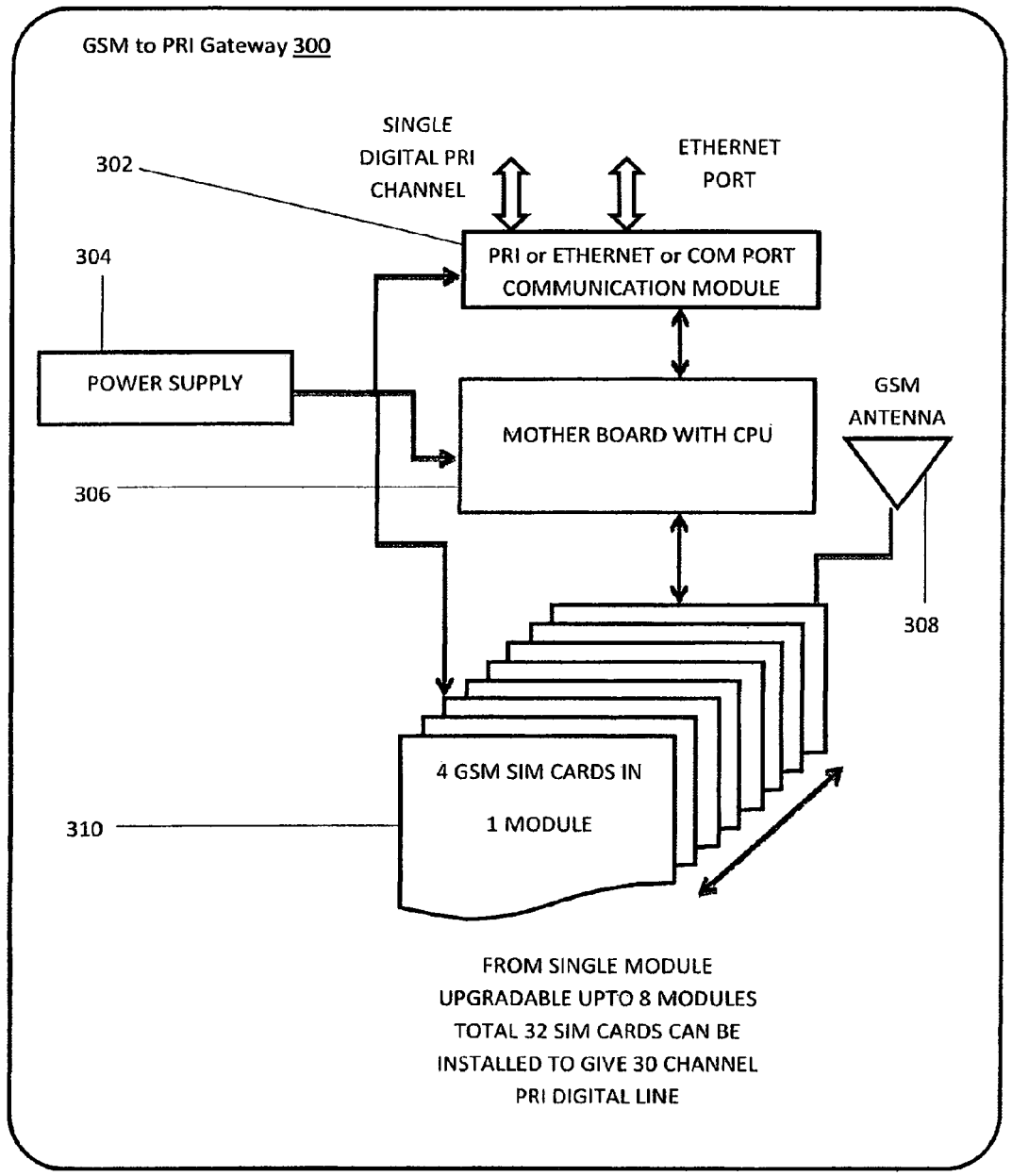
FIG. 3 is a block diagram of an embodiment of a GSM to PRI Multiplexer/De-Multiplexer for processing call traffic on communications channels utilizing E1 signal format.

FIG. 3 is a block diagram of a GSM to PRI Multiplexer/ De-Multiplexer (GSM to PRI Gateway 300) for processing call traffic on communications connection that utilizes E1 signal format. The communications port 302 may be a PRI, Ethernet, or COM type port. Power supply 304, mother board with CPU 306, GSM Antenna 308, and GSM SIM Card module 310, make-up the essential components of such commercially available GSM to PRI gateways. GSM Antenna 308 facilitates reception and transmissions of mobile messages. Utilizing GSM SIM Card module 310, the number of available channels via a Single modem 300 may be expanded from 1 to 30 channels by increasing the number of installed modules 310 from 1 to 8. If only one channel is desired, modem 300 would require one GSM SIM Card module 310 with one SIM card (not shown) installed. If 30 channels are desired, modem 300 may be populated with 8 GSM SIM Card modules 310.

It should be noted that only 30 (and not 32) channels are available for use because two channels may be reserved for E1 carrier signal overhead and control information even though 32 SIM cards may be installed in the modem. Those skilled in the art will readily understand that a similar modem which processes or utilizes T1 signals may also be employed in various embodiments of the present invention and that the choice of E1 or T1 compatible modems will primarily depend on geographical location (i.e., whether the modems will be employed in locations utilizing E1 or T1 carrier signals on commercial communication networks). Such GSM to PRI gateways as described herein are readily available from suppliers such as Matrix Comsec of 394-GIDC, Makarpura, Vadodara-390 010, India.

Figure 4:
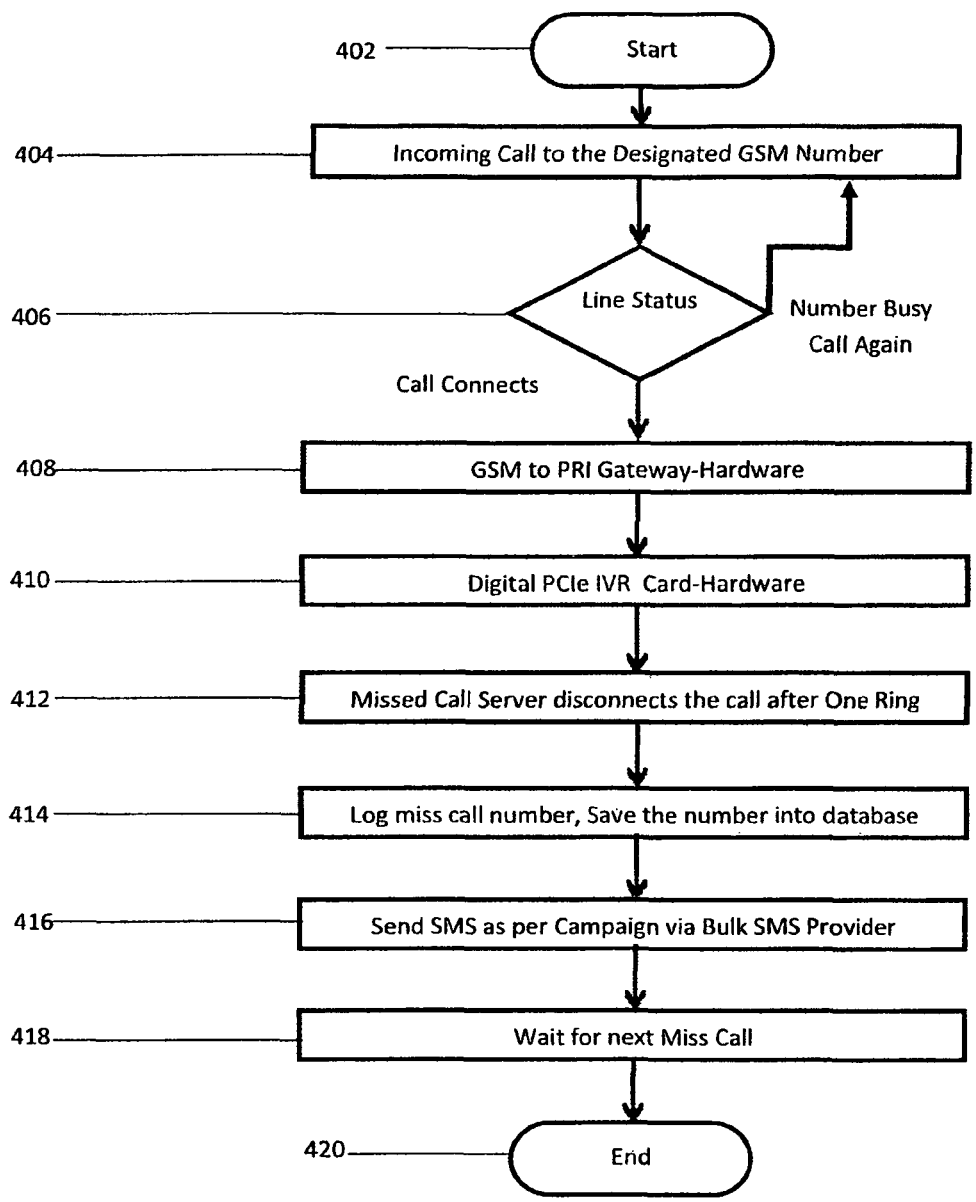
FIG. 4 is a flow diagram of an embodiment of a method for implementing inquiry callback and information update services utilizing a GSM to PRI gateway and Bulk SMS campaign messages.

FIG. 4 is a flow diagram of a method for implementing inquiry callback and information update services utilizing a GSM to PRI gateway and Bulk SMS campaign messages. The method begins in step 402 and in step 404 a GSM to PRI gateway, such as GSM to PRI modem 300, monitors a connected communications network for incoming calls. Concurrently, the gateway monitors the installed gateway channels to ascertain the availability of a called number. If the number is busy the method continues in step 404 for incoming calls. If the called number is available, the number is connected to a computer server (for example computer 100) by the gateway hardware in step 408 via a peripheral component interconnect express (PCIe) IVR card (such as digital IVR card 106) in step 410. Miss call software modules such as Miss Call module 112 and Miss Call IVR with Bulk SMS module 116 operate as described for FIG. 1 to disconnect the call after one ring (step 412), log the caller ID and associated information in a database such as Miss Call Solution Database 118 (step 414), and send an Information campaign solution via a Bulk SMS provider (step 416). In step 418, the gateway waits for the next call. The method ends in step 420.

Figure 5:
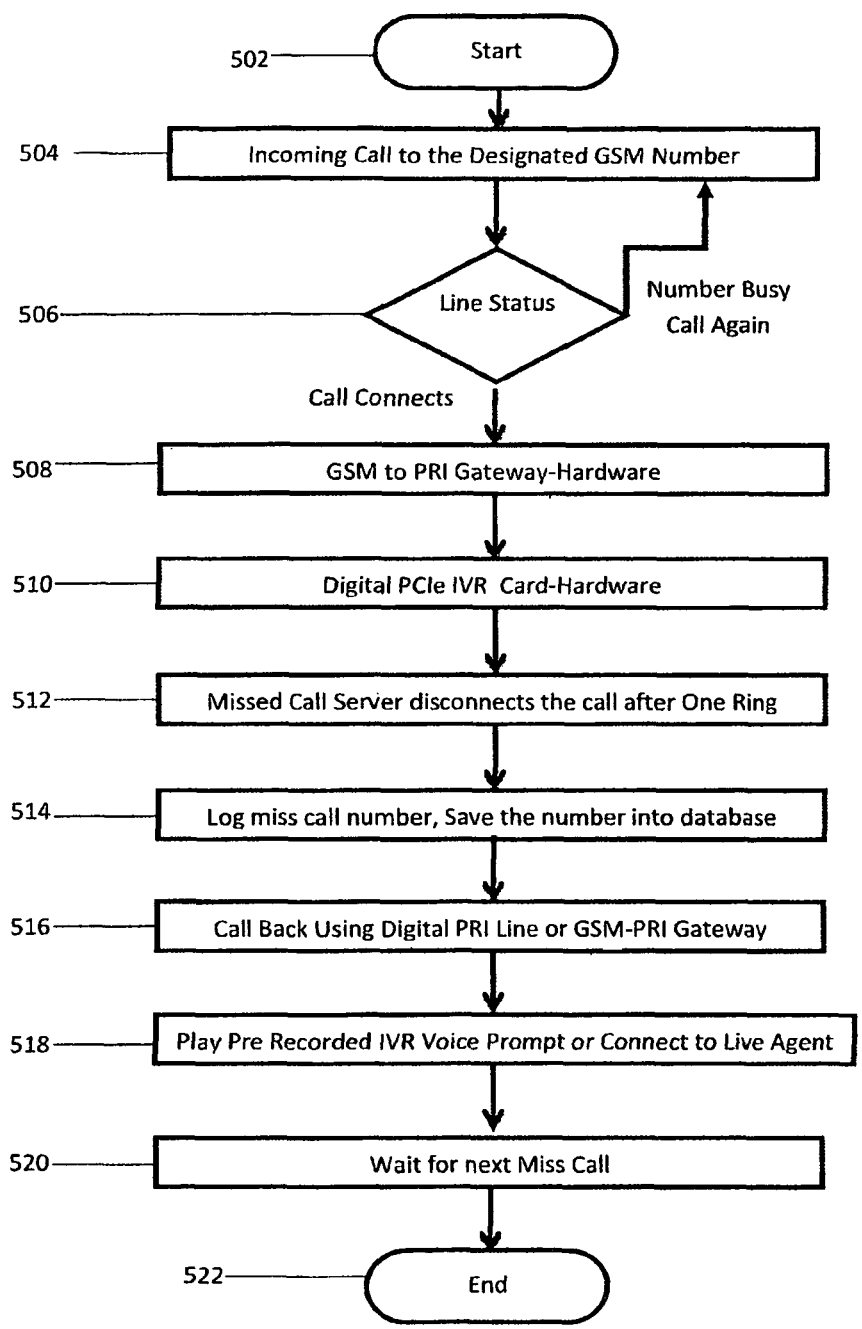
FIG. 5 is a flow diagram of an embodiment of a method for implementing inquiry callback and information update services utilizing a GSM to PRI gateway and a callback service integrated with an IVR system or a live agent.

FIG. 5 is a flow diagram of an embodiment of a method for implementing inquiry callback and information update services utilizing a GSM to PRI gateway and a callback service integrated with an IVR systems or a live agent. The method is similar to the method shown in FIG. 4 except that the information campaign solution is sent or provided via a callback service which is integrated with an IVR system or live agent. The method begins in step 502 and in step 504 a GSM to PRI gateway, such as GSM to PRI modem 300, monitors a connected communications network for incoming calls. Concurrently, the gateway monitors the installed gateway channels to ascertain the availability of a called number. If the number is busy the method continues in step 504 monitoring for incoming calls. If the called number is available, the number is connected to a computer server (for example computer 100) by the gateway hardware in step 508 via a PCIe IVR card (such as digital IVR card 106) in step 510.

Miss call software modules such as Miss Call module 112 and Miss Call IVR with Call-back Service module 114 operate as described for FIG. 1 to disconnect the call after one ring (step 512), log the caller ID and associated information in a database such as Miss Call Solution Database 118 (step 514), call back the caller which was identified and logged (step 516), and provide an information campaign solution either by playing a pre-recorded IVR voice prompt or connecting to Live Agent (step 518). In step 520, the gateway waits for the next call. The method ends in step 522.

Figure 6:
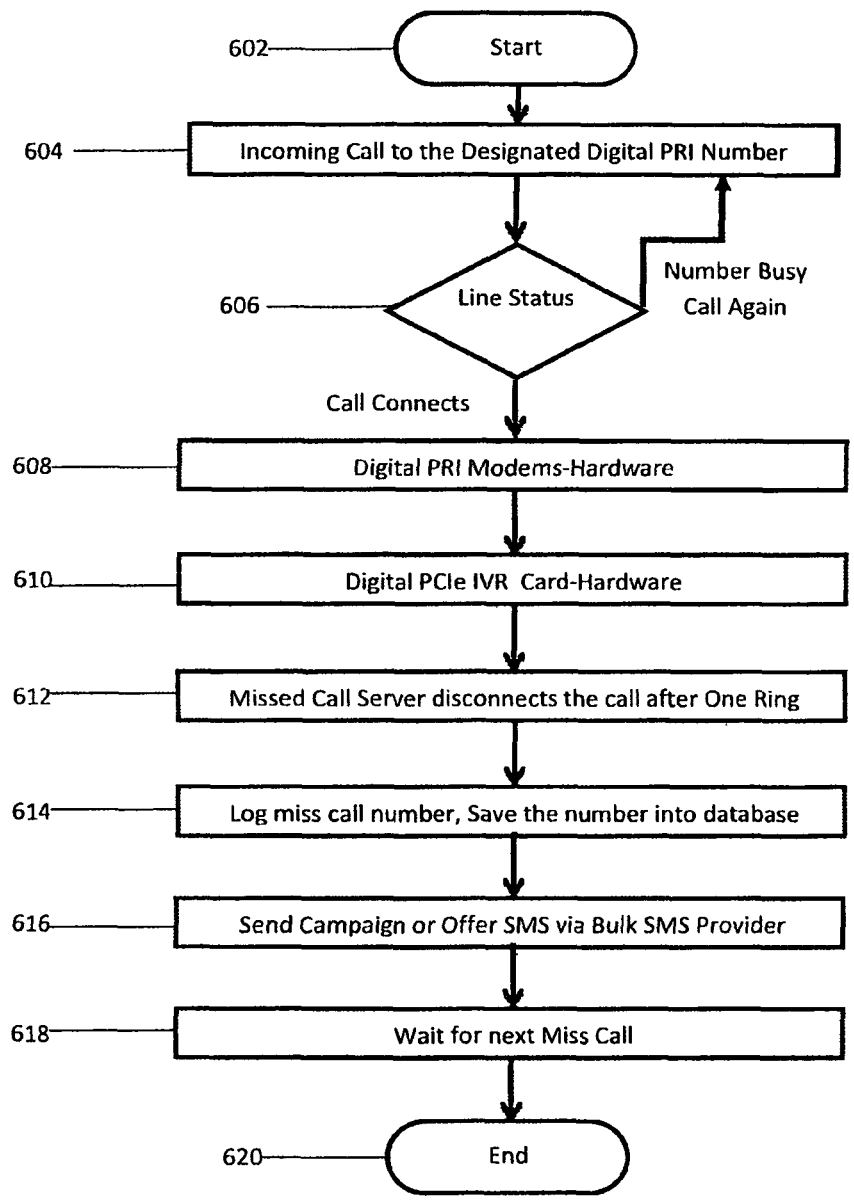
FIG. 6 is a flow diagram of an embodiment of a method for implementing inquiry callback and information update services utilizing a digital PRI and Bulk SMS campaign messages.

FIG. 6 is a flow diagram of an embodiment of a method for implementing inquiry callback and information update services utilizing a digital PRI and Bulk SMS campaign messages. The method is similar to the method shown in FIG. 4 except that the method shown in FIG. 6 utilizes a Digital PRI modem instead of a GSM to PRI gateway. The method begins in step 602 and in step 604 the Digital PRI modem monitors the communications network which is connected to the PRI modem for incoming calls. If the called number is busy, the method continues in step 604 monitoring for incoming calls. If the called number is available, the number is connected to a computer server (for example computer 100) by the Digital PRI modem hardware in step 608 via a PCIe IVR card (such as digital IVR card 106) in step 610. Miss call software modules such as Miss Call module 112 and Miss Call IVR with Bulk SMS module 116 operate as described for FIG. 1 to disconnect the call after one ring (step 612), log the caller ID and associated information in a database such as Miss Call Solution Database 118 (step 614), and send an information campaign solution via a Bulk SMS provider (step 616). In step 618, the Digital PRI line waits for the next call. The method ends in step 620.

Figure 7:
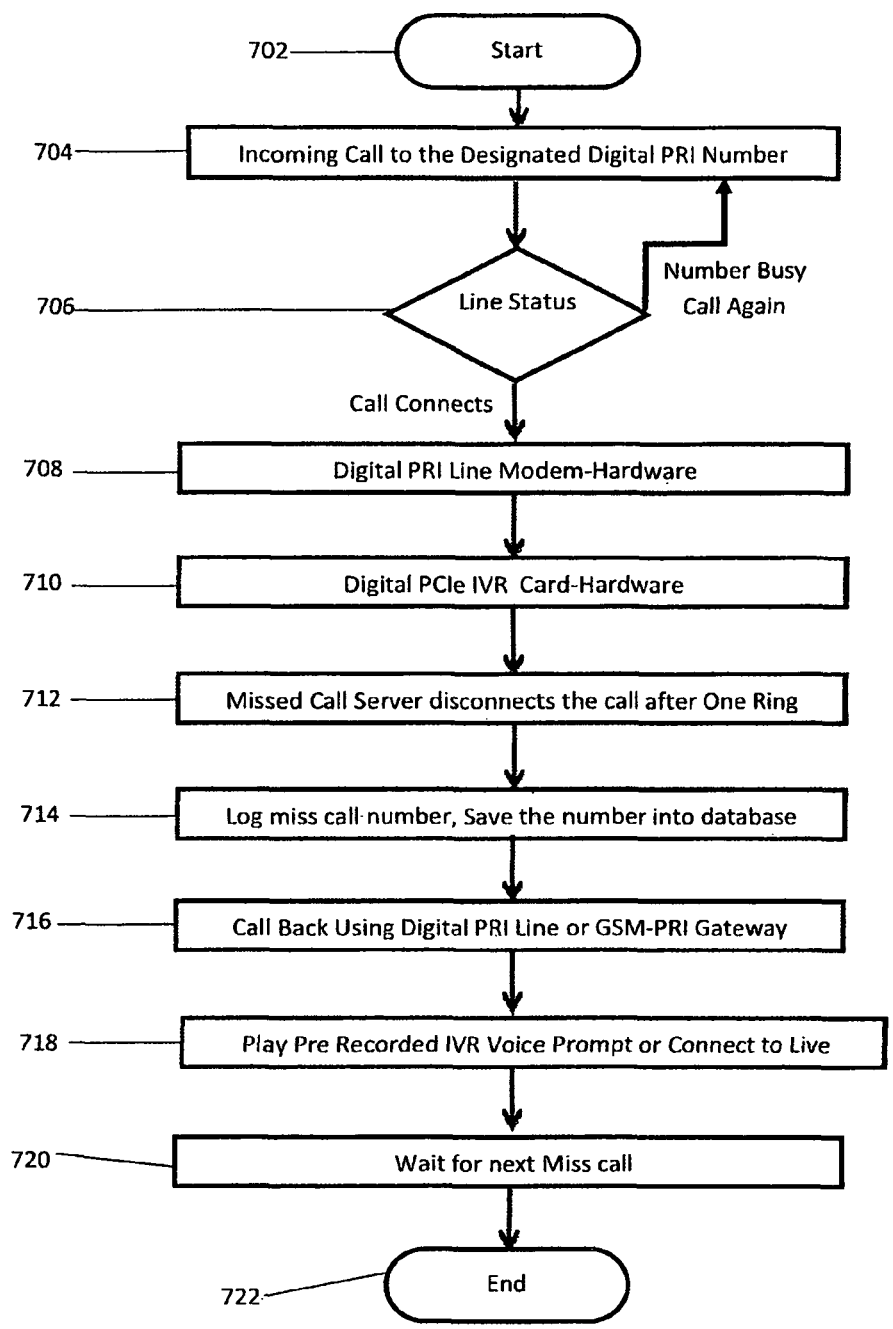
FIG. 7 is a flow diagram of an embodiment of a method for implementing inquiry callback and information update services utilizing a digital PRI and a callback service integrated with an IVR system or a live agent.

FIG. 7 is a flow diagram of an embodiment of a method for implementing inquiry callback and information update services utilizing a digital PRI modem and a callback service integrated with an IVR systems or a live agent. The method is similar to the method shown in FIG. 5 except that the method shown in FIG. 7 utilizes a Digital PRI modem instead of a GSM to PRI gateway. The method begins in step 702 and in step 704 the Digital PRI modem monitors the communications network connected to the PRI Modem for incoming calls. If the called number is busy, the method continues in step 704 monitoring for incoming calls. If the called number is available, the number is connected to a computer server (for example computer 100) by the Digital PRI modem hardware in step 708 via a PCIe IVR card (such as digital IVR card 106) in step 710. Miss call software modules such as Miss Call module 112 and Miss Call IVR with Call-back Service module 114 operate as described for FIG. 1 to disconnect the call after one ring (step 712), log the caller ID and associated information in a database such as Miss Call Solution Database 118 (step 714), call back the caller which was identified and logged (step 716), and provide an information campaign solution either by playing a pre-recorded IVR voice prompt or connecting to Live Agent (step 718). In step 720, the digital PRI line waits for the next call. The method ends in step 722.

Figure 8:
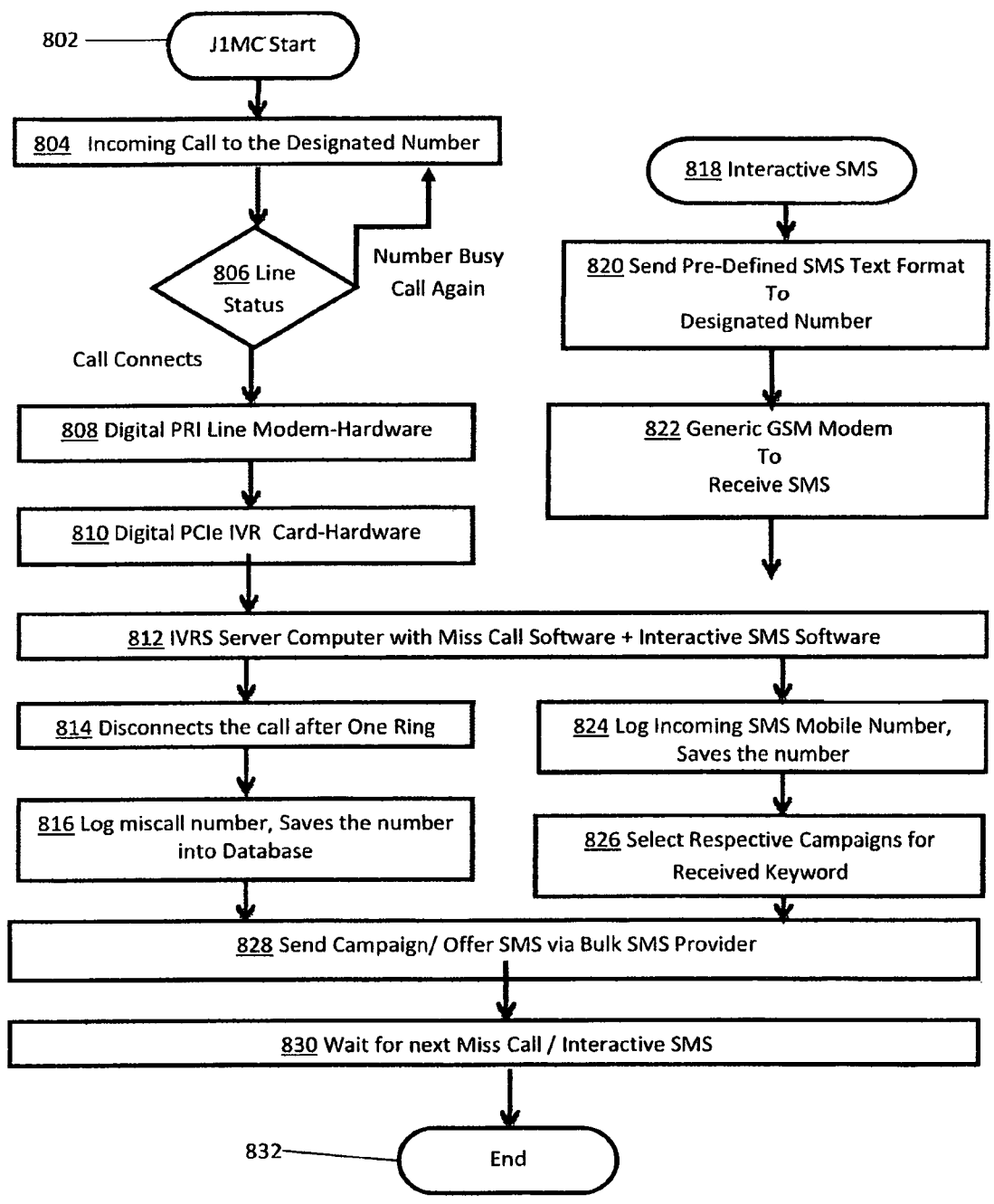
FIG. 8 is a flow diagram of an embodiment of a method for implementing inquiry callback and information update services wherein the inquiry callback service utilizes an interactive SMS service.

FIG. 8 is a flow diagram of an embodiment of a method for implementing inquiry callback and information update services wherein the inquiry callback service utilizes interactive SMS. The use of interactive SMS provides a means to add additional flexibility and security to the inquiry callback and information update services. In the previously described methods the end user, and the service or information of interest to the end user, were automatically matched according to pre-defined parameters stored in a solutions database (such as Miss Call Solution database 118). Based on the identified telephone number, the caller was automatically provided the information or service matching the identified number. There was no need for the caller to enter a keyword or other pre-defined SMS text to inform the system as to what information or service was desired.

However, in the method shown in FIG. 8 the use of interactive SMS allows the caller to choose from a menu of information or services by entering various keywords. Such keywords would be pre-defined and would identify the desired information or service. Pre-defined keywords may also be used to help ensure that secure information is provided to the correct end user (i.e., the end user that has been assigned particular pre-defined keywords or other SMS text). The method begins in step 802. In steps 804, 806, and 808 the Digital PRI modem monitors the communications network connected to the PRI modem for incoming calls. If the called number is busy, the method continues in step 804 monitoring for incoming calls. If the called number is available, the number is connected to a computer server (for example computer 100) by the Digital PRI modem hardware in step 808 via a PCIe IVR card (such as digital IVR card 106) in step 810. Miss call software modules such as Miss Call module 112 and Miss Call IVR with Bulk SMS Service module 116 operate as described for FIG. 1 to disconnect the call after one ring (steps 814), log the caller ID and associated information in a database such as Miss Call Solution Database 118 (step 816), call back the caller which was identified and logged, and provide a campaign solutions or offer via a Bulk SMS provider (step 828). The IVR with Bulk SMS Service module contains interactive SMS software. Therefore, the campaign solution may begin by prompting the end user to enter various pre-defined keywords which would be linked to a menu of desired information or services.

Alternately, as shown in FIG. 8, end users may also avail themselves of campaign services or information updates via interactive SMS messages (steps 818, 820, and 822). Under this scenario, the incoming call is in the form of an SMS message with pre-defined keywords or text (steps 818 and 820). The SMS message is routed to the computer server via a generic GSM modem (step 822). In step 824, the IVR with Bulk SMS software module logs the incoming mobile number and associated data (i.e., the telephone number plus date, time, etc.). A campaign matching the predefined keywords or text in the SMS message is selected and sent to the logged number (steps 824 and 826). In step 830, the incoming line is monitored for the next Miss call or Interactive SMS message. The method ends in step 832.

Figure 9:
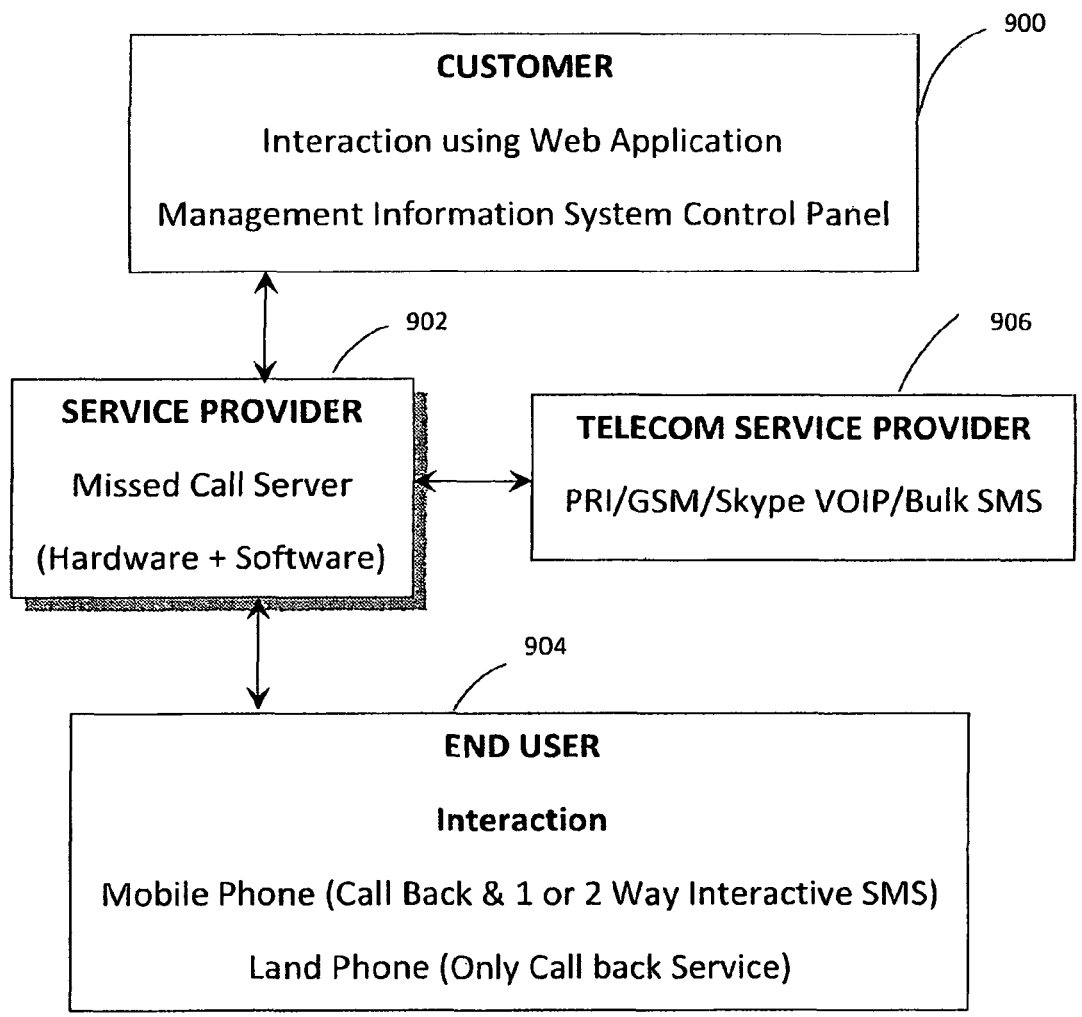
FIG. 9 is a block diagram illustrating exemplary communications among a customer, a service provider, a telecom service provider, and an end user to implement callback.

FIG. 9 shows a block diagram of various parties involved in the callback system. In the embodiment of FIG. 9, a service provider 902 implementing the callback service may act as a third party between the customer 900 (e.g., a telemarketer) and the end user 904 (e.g., a potential buyer of goods/services offered by the telemarketer).

In one example, a telecom provider 906 provides a communication platform (e.g., PRI/GSM/Skype VOIP/Bulk SMS, etc.) between customer 900 purchasing the callback service, service provider 902 implementing the callback server, and end user 904 utilizing the callback service. First, customer 900 would register with service provider 902 using an interactive web application. Registration would allow service provider 902 to perform callback services on behalf of or in conjunction with customer 900. Second, after registration, end user 904 may call service provider 902 using a mobile phone or a land line. Service provider 902 may disconnect the call and obtain information of end user 904.

A return call or an SMS may then be sent from service provider 902 to end user 904 as described above. In the case of SMS, the end user may also be able to send an SMS back to service provider 902 (i.e., 2-way interactive SMS). In general, the SMS communications may include information and/or instructions corresponding the service provider and/or the end user. It is noted that information required for implementing callback (i.e., generating the callback solution) may be obtained by the service provider 902 from customer 900 during or after the registration process.

Figure 10:
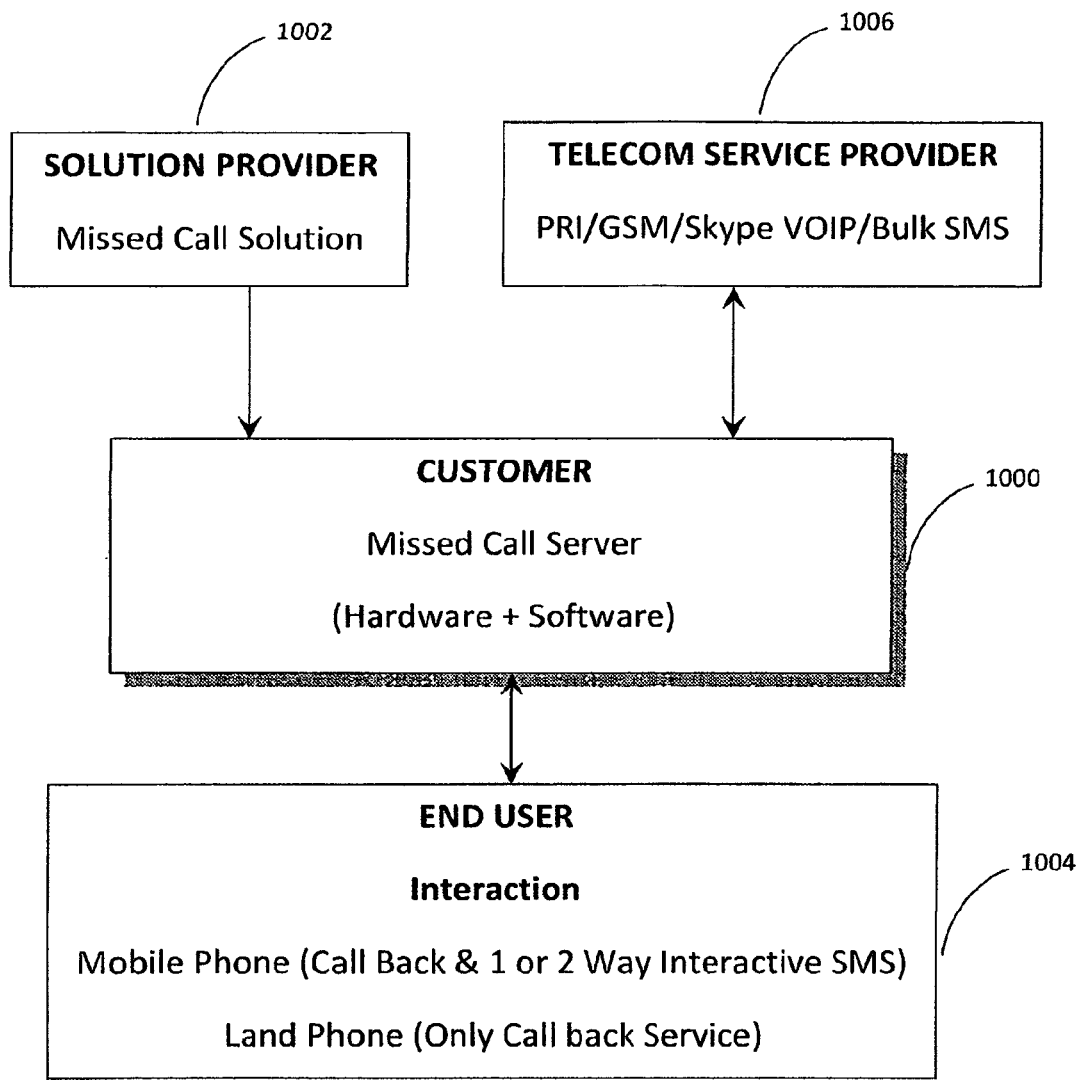
FIG. 10 is a block diagram illustrating exemplary communications among a customer, a solution provider, a telecom service provider, and an end user to implement callback.

FIG. 10 shows another block diagram of the various parties involved in the callback system. In the embodiment of FIG. 10, a solution provider 1002 provides a miss call solution to a customer 1000 (e.g., a telemarketer including a miss call server) that implements the miss call solution in response to an inquiry from end user 1004 (e.g., a potential buyer of goods/services offered by the telemarketer).

In one example, a telecom provider 1006 provides a communication platform between customer 1000 purchasing and implementing the miss call solution, solution provider 1002 providing the miss call solution, and end user 1004. First, customer 1000 would obtain the miss call solution from solution provider 1002. This allows customer 1000 to perform callback services with the end user independently of solution provider 1002 (i.e., the customer implements the server). Second, end user 1004 may call customer 1000. Customer 1000 may disconnect the call and obtain information corresponding to end user 1004. A return call and/or SMS may then be sent from customer 1000 to end user 1004 in a similar manner as described above.

In general, the service provider and customer may perform various interactions and communications (e.g., discussions) for generating the miss call solutions, and come to an agreement for implementing a particular miss call solution.

In one example, the service provider and customer may discuss the type of system to be delivered from the service provider to the customer.

In one example, a stand-alone system may be discussed. Such a system may be independent of any existing customer management information systems (MIS). The stand-alone system may include: i) miss call software Modules, ii) hardware/software requirements/specifications that may include a computer server, PRI modem, digital PRI/BRI card, GSM to PRI device, digital PBX, etc, and iii) a customer user interface module (e.g., generalized/customized web application) which may be used to log missed calls, manage and schedule SMS and/or call back service campaigns and configure missed call ports/channels as per requirements.

In another example, the stand alone system may be integrated with existing customer MIS systems. The integrated system may include i) an additional discussion concerning a desired operating system, database and programming language to be utilized for integration of miss call system with customer MIS system, ii) API coding for integrating into existing programming languages, database and proposed operating systems, and iii) optional customer user interface.

The service provider and customer may also discuss the form of communication that is to be utilized to deliver the miss call solution messages.

In various examples, some of the forms of communication may include: SMS, call back using pre-recorded voice message/IVR prompts via IVR system, return call from a live operator (e.g., call center solution not included), and interactive SMS response.

The service provider and customer may also discuss miss call solution message content and purpose. For example, the message purpose/content (or type) may be transactional (informational).

Examples may include account Information, lucky draws/winning, shipping details, alerts and notifications, etc. In one example, information pertaining to the account of a customer may be sent to the customer by a licensee or a bank or a financial institution or an insurance company or a credit card company or depositories registered with securities and exchange boards or direct to home operators. Information may be given by airlines or railways or their authorized agencies to its passengers regarding travel schedules and ticket information. Booking and reservation information may be transferred. Information from a registered educational institution to its students or their parents or guardians may be communicated. Messages may be transmitted by or on the directions of the government or any related agency. Information may be sent by a registered company to its employees or agents or to its customers pertaining to services or goods to be delivered to such customers.

In another example, the message purpose/content (or type) may be promotional. For example, offers, promotions, discounts, coupons, new product/services releases, contests, etc., may be provided.

Some examples include event information such as venue details, products or services offered, special offers, coupons, vouchers, passes, etc. Invitations for the launch of new products, brands, services, branches, etc., may also be provided. Special offers, last minute offers, limited time offers, etc, may also be provided.

A sample promotional SMS offer may read as: "Visit our service department for maintenance and get %25 off! You will also be entered in our New Car Giveaway Sweepstakes". A sample coupon sent via text message may read as: "Best DVD deals this week on DVDmagicstore! Get 3 of the latest hit movie releases and take 1 free DVD Live Concert of your favorite band". A sample contest offer may read as: "The first person to come in and show this message gets a free bottle of Soft Drink".

In another example, admission dates and venues for educational institutions may be provided. Discussion of customer provided end user information may be performed such that a particular campaign can be linked to a specific end user if desired.

Monetary compensation for implementing the miss call solution may also be discussed. For example, licenses and contracts such as annual/lifetime product/solution licenses, and support service licenses may be discussed and agreed upon between the customer and the miss call solution provider.

Figure 11:
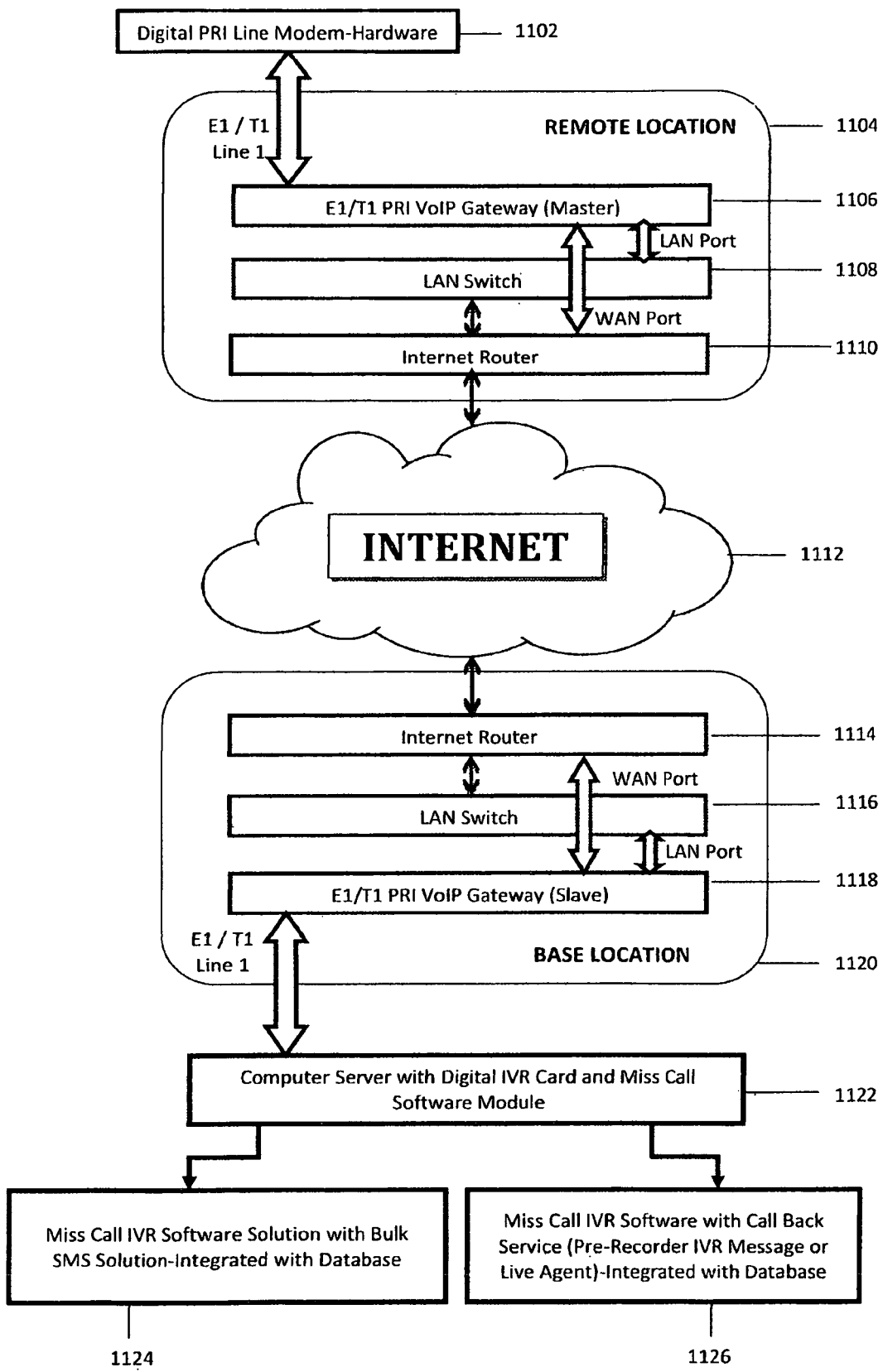
FIG. 11 is a block diagram illustrating an embodiment of a method of forwarding and processing digital PRI services from a remote Location to a base location for implementing Long Distance inquiry call back and information update services.

FIG. 11 is a block diagram illustrating an embodiment of a method of forwarding and processing digital PRI services from remote locations to base locations for implementing Long Distance inquiry call back and information update services.

Digital PRI Line Modem-Hardware 1102 is a modulator/demodulator for an integrated services digital network (ISDN)/public switched telephone network (PSTN) PRI signal from a E1/T1 Line provider. The output from the E1/T1 PRI Line is the input to E1/T1 PRI VoIP Master Gateway 1106. At Remote Location 1104, the E1/T1 PRI Line signals are forwarded through the VoIP connection via Internet provider 1112.

E1/T1 PRI (VoIP) Gateway 1106 may have one or more E1/T1 PRI ports enabling direct connection of VoIP traffic to a PSTN/fixed line ISDN for extending communications and reducing call charges, as well as for facilitating the ability to locate Missed Call Servers at one Base Location for Information Updates and Callback Services. Locating Missed Call Servers at one Base Location can reduce the overhead cost related to multiple data and support centers.

E1/T1 PRI VoIP Gateway 1106 may include a power supply, E1/T1 PRI line, LAN (local area network), WAN (wide area network) Ports and processing boards incorporating EEPROM with firmware containing WEB based configuration and utilities which can be configured and monitored remotely using a static IP address. Depending on location requirements, Gateway 1106 may also be configured in Master mode or Slave mode.

In some examples, Gateway 1106 may have more than one E1/T1 PRI Port. Gateways with a single E1/T1 PRI Port can be configured to work in one of Master mode or Slave mode. Gateways with Multiple E1/T1 Ports may provide the flexibility of being configured to work as Master and Slave simultaneously.

To implement inquiry call back and information update services as shown in FIG. 11, two or more E1/T1 PRI Gateways such as Gateway 1106 may be configured (one Gateway being configured as the Master which is installed at a Remote Location such as Remote Location 1104, and another Gateway configured as the Slave installed at a Base Location, such as Base Location 1120). The Missed Call server and Data Center are also located at the Base Location. Both Master and Slave Gateways have static IP addresses that may be configured through a Web Based Configuration Management software module which would be configured in the Gateway to facilitate communications via the Internet.

Master Gateway 1106 receives inputs through the E1/T1 PRI Line from the PRI Line Service Provider via an E1/T1 Port. The E1/T1 port then converts the E1/T1 signals into a VoIP signal and forwards that VoIP data through a LAN port to the Local Switch. The Local Switch is configured with a Local IP address and passes the signal to the WAN port which is connected to an Internet router configured with a Static IP Address. Alternatively, Master Gateway 1106 can be connected directly to the Inter Router 1110 where local management or monitoring may not be needed.

LAN Switch 1108 is a general LAN Switch used to connect a Local Area Network to various network devices. In this method LAN Switch 1108 is used to connect the Gateway 1106 to other devices on the local network. In general, the devices may be configured and managed locally.

Internet router 1110 connects through a LAN and a WAN port to Internet 1112. Internet 1112 may be a general Internet service provider (ISP, also called Internet access provider). An ISP is a business or organization that offers Users access to the Internet and related services.

Base Location 1120, which houses all Slave Gateways (such as Gateway 1118) is connected to the Remote Location. Base Location 1120 includes hardware such as Internet Router 1114 and LAN Switch 1116 in a similar manner to the hardware in Remote Location 1104. That is, Internet Router 1114 serves a similar function as Internet Router 1110. LAN Switch 1116 also serves a similar function as LAN Switch 1108.

The Slave Gateway (or Gateways) is configured to recognize the Static IP address of the Master Gateway. Once handshaking is complete and a connection is established between the two gateways, the slave converts the received VoIP data back into an E1/T1 PRI Signal and outputs that signal through the E1/T1 PRI Port. The E1/T1 PRI Port is connected to a Computer Server with a Digital IVR Card and Miss Call Software Module. In one example, the Gateways may be managed locally via a LAN port.

Call information from Gateway 1118 is sent to computer server 1112 for processing. The computer server processes the call information in a manner similar to the method described above for FIG. 1. A Miss Call solution implemented by computer server 1122 is integrated with a Bulk SMS service 1124 or with Callback Service 1126 for delivery to the end user (i.e., the caller) as prescribed by a customer's campaign solution whose information is stored in the computer server database (for example, Miss Call Solution Database 118).

Figure 12:
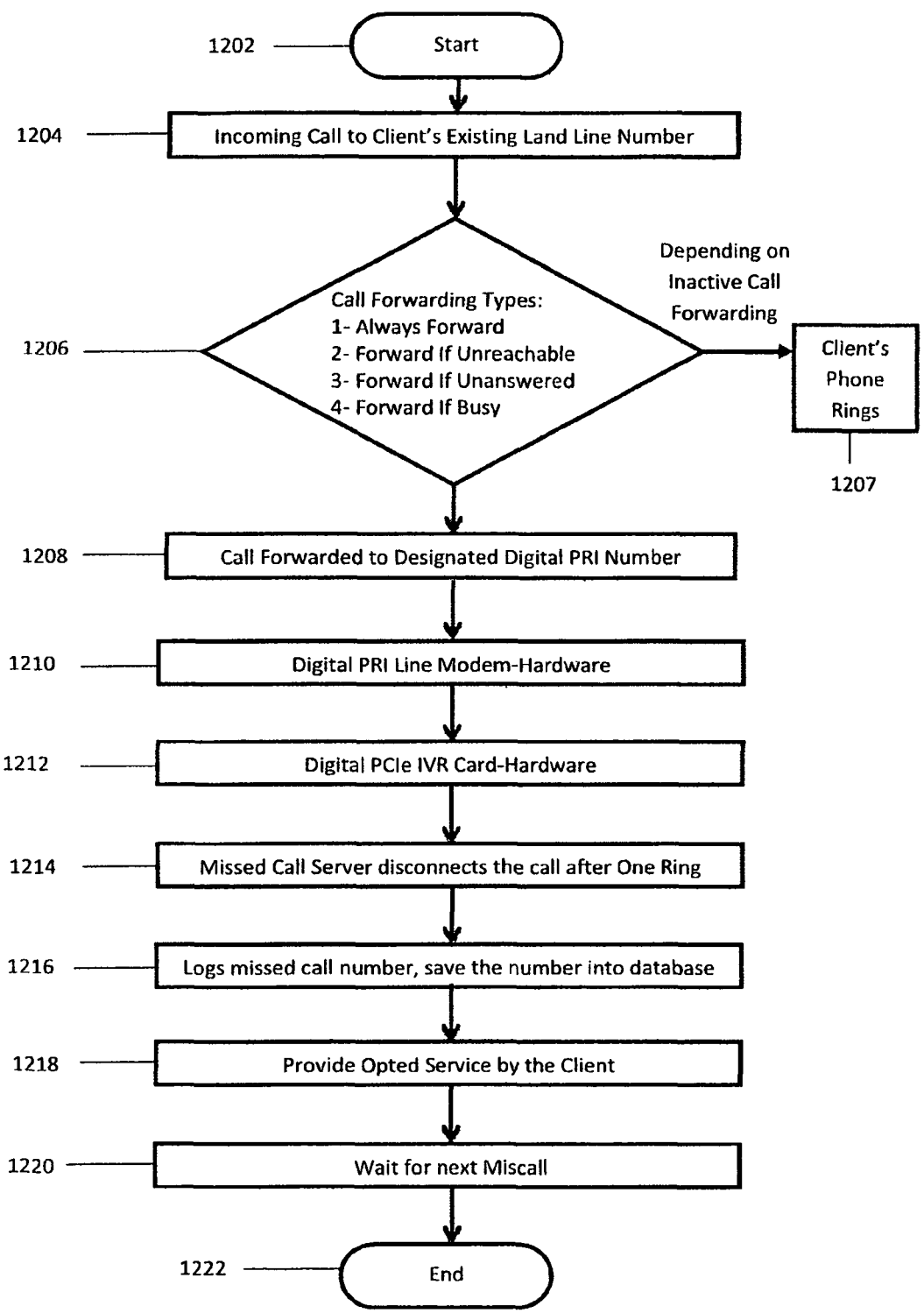
FIG. 12 is a flow diagram illustrating exemplary communications among a customer (end user), a client, and service provider for implementing inquiry call back and information update services using a client's existing phone number with Call Forwarding features.

FIG. 12 is a flow diagram illustrating exemplary communications among a Customer (End User), a Client, and a Service Provider for implementing inquiry call back and information update services using a Client's existing Phone number with Call Forwarding Features.

In step 1202 and in step 1204, a call is placed to a Client's existing telephone number (that is, a telephone number which is already in general use for, at minimum, incoming call traffic).

In Step 1206 the Client who wants to subscribe to inquiry call back and information update services using their existing phone number, may subscribe specifying the service method which utilizes Call Forwarding features that are available from most Telephone Services Providers. The client may deactivate the Voice Mail/Message feature on their existing telephone in order to subscribe to the service. The Client's Calls are forwarded from the existing phone number to the Subscribed Digital E1/T1 PRI number automatically depending on the type of call forwarding employed (e.g. Always Forward, Forward If Unreachable, Forward If Unanswered, Forward If Busy, etc.).

The Client may still continue to use their existing telephone for regular call volume. If the Client decides to deactivate Call Forwarding to the designated/chosen Digital E1/T1 PRI Number, the Client's existing telephone rings as usual for incoming calls, which is indicated as step 1207.

In Step 1208 the Digital E1/T1 PRI Number is connected to the Digital PRI Line Modem in step 1210, and the method proceeds as similarly described above for FIG. 6 starting at step 608. If the called number is available (in this case, a call has been forwarded to the called number), the number is connected to a computer server (for example computer 100) by the Digital PRI modem hardware in step 1210 via a PCIe IVR card (such as digital IVR card 106) in step 1212. Miss call software modules such as Miss Call module 112 and Miss Call IVR with Call-back Service module 114 operate as described for FIG. 1 to disconnect the call after one ring (step 1214), log the caller ID and associated information in a database such as Miss Call Solution Database 118 (step 1216). In Step 1218, the subscribed services options are provided. In step 1220, the digital PRI line waits for the next call. The method ends in step 1222.

Figure 13:
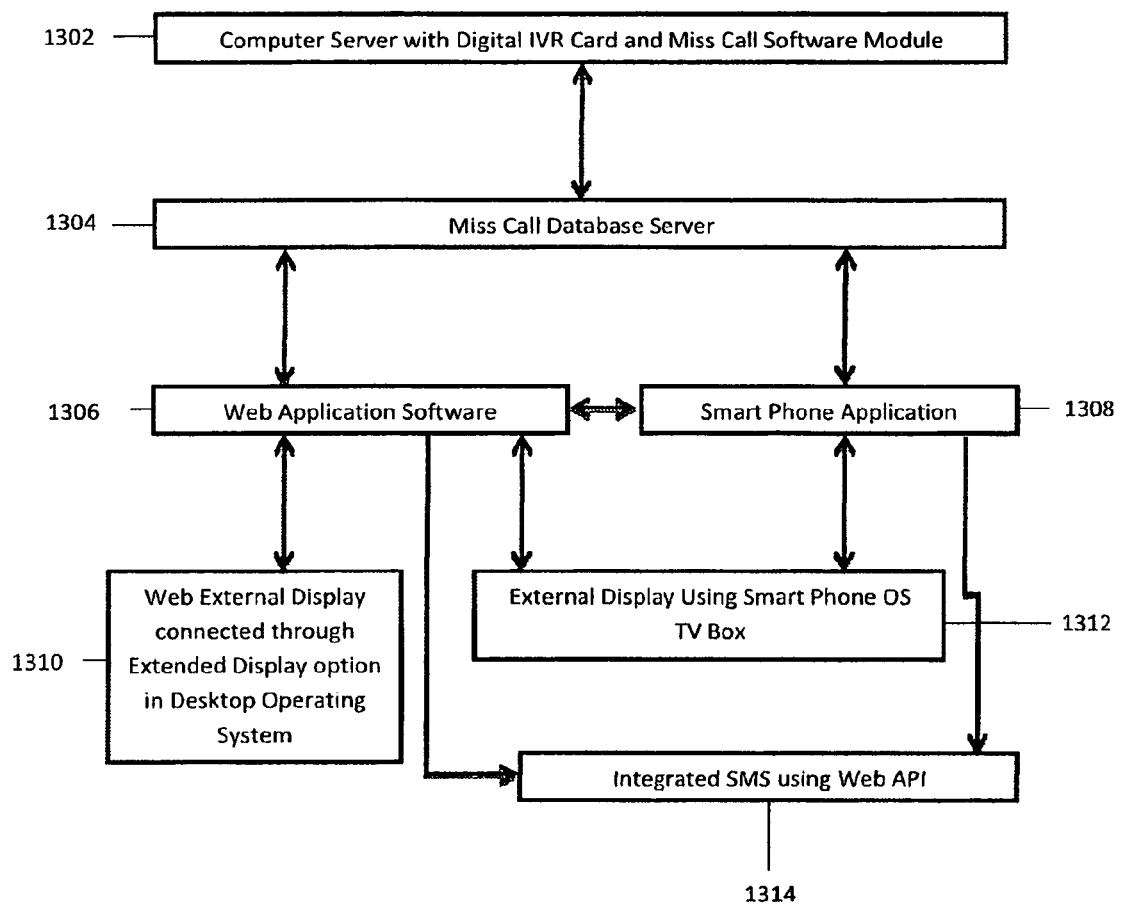
FIG. 13 is a block diagram illustrating exemplary integration of inquiry call back and information update services with Smart Phone applications, an external large screen display with a smart TV box, and bulk SMS services.

FIG. 13 is a block diagram illustrating exemplary integration of inquiry call back and information update services with Smart Phone Applications an External Big Screen Display with Smart TV Box, and Bulk SMS services.

Call information is sent to a computer server 1302 (which is similar to computer 100) for processing. The computer server processes the call information in a manner as described above for FIG. 1. Miss Call Database Server 1304 contains all the logs of missed call numbers and other data related to a client's subscribed services. Web Application Software 1306 is the front end software for the client's management information systems. Web External Display 1310 is connected through an Extended Display option of the typical Desktop Operating System for showing notifications and status updates using a separate web page connected with the web application software. Smart Phone Application software 1308 may be designed specifically for a particular brand or type of Smart Phone depending on the OS (operating system) platform utilized by the particular Smart Phone.

External Display 1312 utilizing a Smart Phone OS TV Box allows the installation of Smart Phone Apps designed to display information on big screens. Notifications and status updates may be displayed from another connected Smart Phone App on another device using connected devices technology. Clients may utilize the display systems shown in FIG. 13 in various different arrangements:

Example 1—Using Web Application Software 1306 with a web external Display 1310. A client utilizing this option may not need a great deal of mobility.

Example 2—Using Smart Phone Application 1308 with an External Big Screen Display with Smart TV Box 1312. A client utilizing this option may require mobility but does not have a need for stationary displays.

Example 3—Using a plurality of the above solutions (e.g., Web Application Software 1306 with a web external Display 1310, Smart Phone Application 1308 with an External Big Screen Display with Smart TV Box 1312, etc.), communicating with each other directly through database server or a smart phone app notification server services provided by the Smart Phone OS company server or from the Miss Call solution server. A client utilizing this option may require the flexibility to have information displayed at certain fixed locations and/or on mobile communications devices. It is noted that integrated SMS using Web API 1314 allows Miss Call Software 1302, Web Application Software Step 1306, and Smart Phone Application Software 1308 to send Bulk SMS using external Web API.

Figure 14:
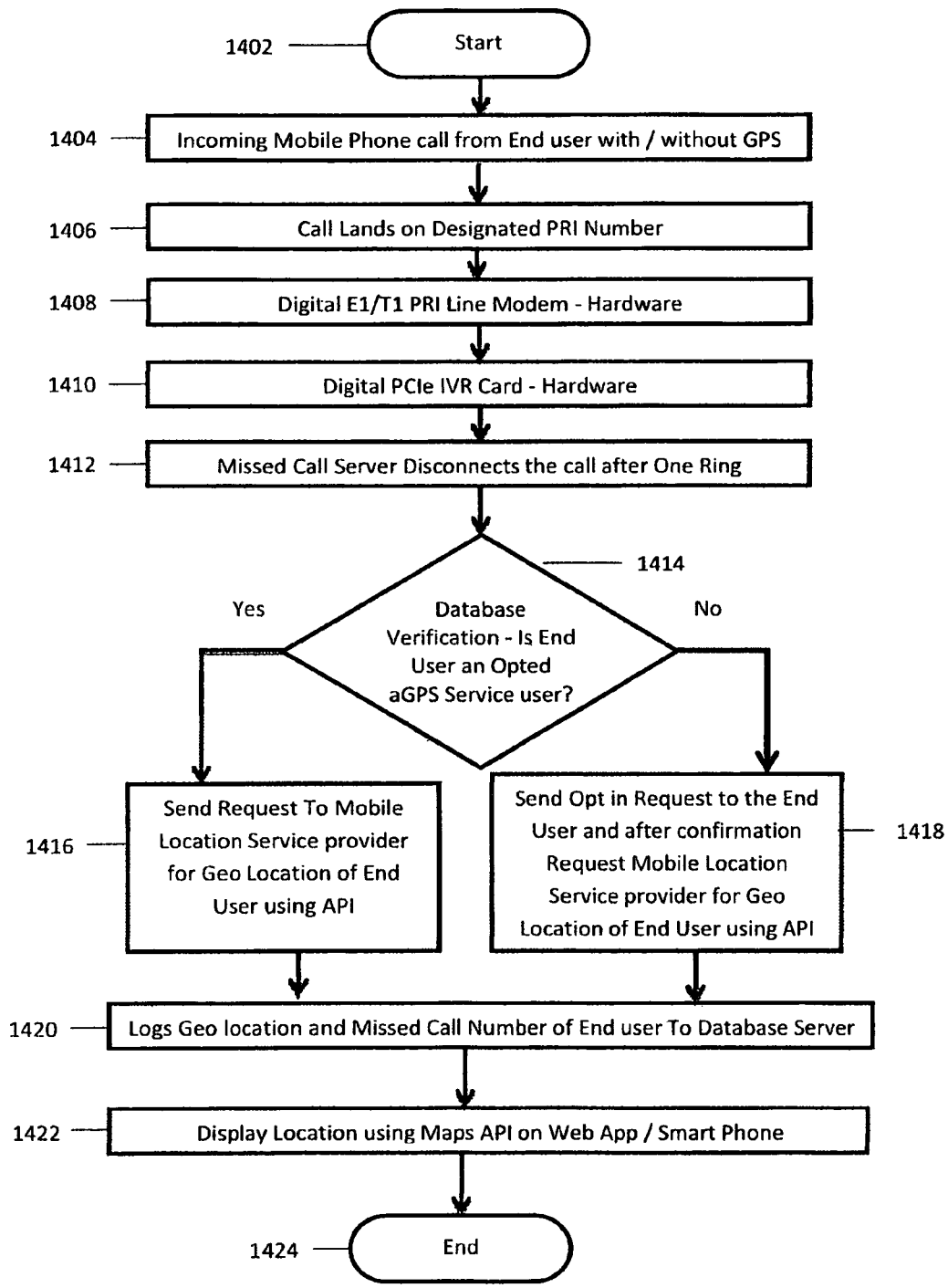
FIG. 14 is a flow diagram illustrating exemplary integration of inquiry call back and information update services with mobile location services using network based assisted GPS (aGPS) API.

FIG. 14 is a flow diagram illustrating exemplary integration of inquiry call back and information update services with Mobile Location Services using Network based assisted GPS (aGPS) API. These services may be utilized when a client wishes to monitor the changing location of mobile employees, assets, or even consumers.

The method begins in step 1402, and in step 1404 an incoming call from a mobile phone lands on a designated PRI number in step 1406. The number is connected to a computer server (for example computer 100) by the Digital PRI modem hardware in step 1408 via a PCIe IVR card (such as digital IVR card 106) in step 1410. Miss call software modules such as Miss Call module 112 and Miss Call IVR with Call-back Service module 114 operate as described in FIG. 1 to disconnect the call after one ring (step 1412). In Step 1414 Missed Call software checks the database for the Opt In status of the End User. If the End User has already opted for aGPS service then the method proceeds to Step 1416. Otherwise, the method proceeds to step 1418. In Step 1416, after confirmation of availability of End User Opt in, the Missed Call server places a request to the Mobile Location Service provider for the Geo Location of the End User using the API. Upon receiving a response from the Mobile Location Services provider, the Geo Location information is processed in Step 1420. If the method proceeds through Step 1418, the Missed Call server sends a SMS request to the End User to Opt for the aGPS service by once again calling the designated PRI Number. Upon receiving an Opt In confirmation, the Miss Call server sends a request to the Mobile LocationService provider for the Geo Location of End User using API. The information is then processed in Step 1420. In Step 1420, the End User Geo location, Telephone Number, and the Date and Time of the Call is logged in a Database Server. In Step 1422, the Client may monitor or check the End User Location using either Web Application Software or Smart Phone Application software integrated with Online Maps Application API to pinpoint the Geo Location of the End User during the date and time of the call. The Method ends in Step 1424.

While the foregoing is directed to various exemplary embodiments of the present invention, other and further embodiments of the invention may be devised without departing from the basic scope thereof, and the scope thereof is determined by the claims that follow.

The invention claimed is:

1. A system for generating a miss call solution comprising a computer system configured to: receive information corresponding to a service provided by a customer, generate the miss call solution based on the received information, intercept an incoming call from a caller inquiring about the service, identify and log information corresponding to the caller, terminate the incoming call without interacting with the caller, and provide the generated miss call solution to the identified caller, the miss call solution including information corresponding to the service, wherein the computer system and the customer perform bi-directional communication to discuss the generation of the miss call solution, the bi-directional communication includes an agreement between the computer system and the customer that defines the miss call solution;

and wherein the computer system and the customer agree on a type of hardware system to implement the miss call solution, a type of communication for communicating the miss call solution to the caller, a type of content conveyed in the miss call solution to the caller, and a type of monetary compensation paid by the customer for implementation of the miss call solution.

\* \* \* \* \*